United States Patent [19]

Itoh et al.

[11] 3,923,879

[45] Dec. 2, 1975

[54] PROCESS FOR PREPARING 4-AMINOMETHYL CYCLOHEXANE CARBOXYLIC ACID-1

[75] Inventors: Hirataka Itoh; Yutaka Usubuchi; Chisei Shibuya; Koryo Itoh, all of Tokyo, Japan

[73] Assignee: Asahi Kasei Kogyo Kabushiki Kaisha, Osaka, Japan

[22] Filed: Nov. 19, 1973

[21] Appl. No.: 416,793

[30] Foreign Application Priority Data

Nov. 29, 1972  Japan.............................. 47-119039

[52] U.S. Cl. ............................................. 260/514 J
[51] Int. Cl.² ......................................... C07C 99/100
[58] Field of Search ....................... 260/468 J, 514 J

[56] References Cited
UNITED STATES PATENTS 3,702,867  11/1972  Kohno ................................. 260/514

FOREIGN PATENTS OR APPLICATIONS 55,034     4/1967   Germany ............................. 260/515
1,455,813  10/1966  France ................................ 260/514
433,101    5/1968   Japan .................................. 260/514

*Primary Examiner*—Robert Gerstl
*Attorney, Agent, or Firm*—Cooper, Dunham, Clark, Griffin & Moran

[57] ABSTRACT

A one-step process for the industrial production of highly purified 4-aminomethyl cyclohexane carboxylic acid-1 in high yield is provided. p-Cyanobenzoic acid is heated in a hydrogen atmosphere at an elevated temperature in the presence of a hydrogenation catalyst in an aqueous medium containing ammonia, and at least one alkali- or alkaline earth-metal hydroxide compound together with alcohol or ether. The resulting product is a useful monomer in the production of homo- or co-polymers.

9 Claims, No Drawings

PROCESS FOR PREPARING 4-AMINOMETHYL CYCLOHEXANE CARBOXYLIC ACID-1

THE INVENTION

The present invention relates to methods for producing 4-aminomethyl cyclohexane carboxylic acid-1 in high yield from lower alkyl esters of p-cyanobenzoic acid as a starting material by simultaneously conducting three different types of reactions; saponification of ester radical, hydrogenation of cyano radical to aminomethyl radical and hydrogenation of benzene ring to cyclohexane ring.

Various processes for the production of 4-aminomethyl cyclohexane carboxylic acid-1 are known, but they are generally unsatisfactory because they require too many reaction steps. For example, in the method via p-aminomethyl benzoic acid which is considered to be commercially feasible, at least three reaction steps are required from p-nitrobenzoic acid to p-aminomethyl benzoic acid according to Japanese Pat. No. 523684 and at least three reaction steps are required from p-aminomethyl benzoic acid to 4-aminomethyl cyclohexane carboxylic acid-1. Accordingly, at least six reaction steps are required in total. Even if the procedure of DOS No. 1929743 is followed, at least four reaction steps are required.

It is known that alkyl esters of p-cyano benzoic acid can be prepared in high yield by one step reaction utilizing terephthalonitrile and di-lower alkyl esters of terephthalic acid as stating materials. Therefore, by the process for producing 4-aminomethyl cyclohexane carboxylic acid-1 according to the present invention, the final product can be obtained by two reaction steps from the original starting compound.

In preparing 4-aminomethyl cyclohexane carboxylic acid-1 from lower alkyl esters of p-cyanobenzoic acid, three different reactions, namely hydrolysis of the ester radical, hydrogenation of the cyano radical to an aminomethyl radical and hydrogenation of the benzene ring to cyclohexane ring, must be effectuated. It has not heretofore been known to carry out these reactions simultaneously.

It has now been discovered in accordance with this invention that 4-aminomethyl cyclohexane carboxylic acid-1 can be prepared in one step in high yield by heating a lower alkyl ester of p-cyanobenzoic acid in a hydrogen atmosphere in the presence of a nickel catalyst in an aqueous medium containing ammonia together with at least one alkaline reagent, and an alcohol or an ether.

The present invention is most advantageous since 4-aminomethyl cyclohexane carboxylic acid-1 is produced in high yield by a one-step reaction from a lower alkyl ester of p-cyanobenzoic acid which is itself readily prepared in one-step from commercially available material. Moreover, the nickel catalyst is readily available at a low price so that it is not necessary to recover or regenerate the catalyst. Since there is no need to protect the amino radical, an hydrolysis step is not required.

The alkyl esters of p-cyanobenzoic acid which may be employed as the starting materials in this invention may be represented by the formula,

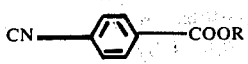

wherein R is an alkyl group suitably containing one to six carbon atoms. Typical alkyl groups may be straight, branched or cyclic and include, for example, methyl, ethyl, n-propyl, isopropyl, n-butyl, isobutyl, sec-butyl, n-amyl, isoamyl, n-hexyl, cyclohexyl and cyclopentyl groups.

The catalyst according to the invention may be any nickel catalyst generally used for the hydrogenation reaction. Raney nickel or reduced nickel catalysts supported on an inert carrier such as diatomaceous earth or alumina are preferred. The amount of the catalyst employed is from 5 to 200 % calculated as nickel metal, based on the weight of the starting material, and from 10 to 70 % is preferable for promoting the smooth process of the reaction, and from the view point of economics.

The alcohol or ether compound used in the invention can be selected from any of a large number of compounds. Reaction inert compounds are preferred. They may be straight, branched or cyclic, and may contain more than one alcohol or ether group. Examples of alcohol or ether compounds are methyl-, ethyl-, n-propyl, iso-propyl-, n-butyl-, iso-butyl, sec-butyl, tert-butyl, n-amyl, iso-amyl, n-hexyl-, heptyl-, octyl, 2-ethyl hexyl-alcohol; ethylene glycol, trimethylene glycol, glycerine, cyclohexyl alcohol, cyclopentyl alcohol, cyclohexyl methyl alcohol etc.; aliphatic ethers such as mono or mixed ethers comprising two alkyl groups selected from the group of methyl-, ethyl-, n-propyl-, iso-propyl, n-butyl-, iso-butyl-, sec-butyl-, tert-butyl-, n-amyl-, iso-amyl, etc.; cyclic ethers such as oxetane, tetrahydrofuran, tetrahydropyran, dioxane; glycol ethers such as ethylene glycol monomethyl ether, ethylene glycol dimethyl ether, diethylene glycol; polymethylene glycol such as diethylene glycol, trimethylene glycol, etc. Mixtures of alcohols and ethers can be used.

The amount of alcohol or ether used in the invention is 0.1–50 mol per mol of lower alkyl ester of p-cyano benzoic acid, and 0.5–20 mol is preferable from the view points of reaction rate and selectivity.

Exemplary alkaline reagents include hydroxides of alkali metals such as lithium hydroxide, sodium hydroxide, potassium hydroxide; and hydroxides of alkaline earth metals such as magnesium hydroxide, calcium hydroxide and barium hydroxide. Mixtures of these compounds may also be employed.

The amount of the alkaline reagent employed is normally sufficient to provide 0.5 gram equivalent of the metallic ion for each mol of alkyl ester of p-cyanobenzoic acid, and the preferred amount is in the range of from about one to ten gram equivalents of metallic ion for each mol of the alkyl ester of p-cyanobenzoic acid.

The amount of ammonia is typically in the range of from 2 to 10 gram equivalents of ammonium ion for each mol of the alkyl ester of p-cyanobenzoic acid. Ammonia is employed as an aqueous ammonia solution, and the concentration of ammonia in the aqueous medium is preferably from 1 to 14 N to improve the conversion of the cyano group to the aminomethyl group.

The amount of hydrogen employed is at least sufficient to hydrogenate the cyano group and the benzene nucleus, and generally a molar excess is utilized for the purpose of efficient conversion.

While the reaction can be carried out at atmospheric pressure, it is generally advisable to utilize a pressure above atmospheric. The optimum range from the view point of coupling acceptable yield with the cost of equipment is from about 10 to 200 atmospheres.

The reaction is usually carried out in a closed vessel preferably with stirring.

The reaction temperature is typically from 10°C. to 250°C., and the preferred range is from 35°C. to 200°C.

The period of reaction may vary within wide limits depending upon such factors as the temperature and pressure selected, the catalyst chosen, the amount of catalyst employed and other factors. Generally, however, it has been found that the reaction periods of from 30 minutes to 10 hours are sufficient. The reaction may be carried out, for example, at a temperature of about 35°C. to 100°C. for about 0.5 to 1 hour and subsequently at a temperature of about 130°C. to 200°C. for about 3 to 7 hours.

In the event that one equivalent of alkaline reagent is employed it is preferred for improved reaction rate to make the addition in two portions.

The reaction product thus obtained can be recovered by any treatment including removal of the catalyst, neutralization, concentration, crystallization and treatment by ion-exchange resin, thereby to obtain a high yield of highly pure 4-aminomethyl cyclohexane carboxylic acid-1.

Exemplary hydrogenation catalysts include Raney metal catalysts such as developed Raney nickels including W-1, W-2, W-3, W-4, W-5, W-6, W-7 and W-8; nickel catalysts such as reduced nickel, Urushibara nickel catalyst; Raney nickels which are used in the developed form.

The following, non-limiting examples are given by way of illustration only.

EXAMPLE 1

In a 300 ml. stainless steel autoclave equipped with a stirrer there were charged 16.1 g. of the methyl ester of p-cyanobenzic acid, 8.0 g. of sodium hydroxide, 80 ml. of a 4.8 % aqueous ammonia solution, 6.4 g. of methanol and 1.6 g. of developed Raney nickel (made by Kawaken Fine Chemical Co.; NDHT - 90). Hydrogen was introduced thereto until the hydrogen pressure reached 60 atms. The autoclave was heated to 120°C. and stirring was continued for 5 hours at 120°C. After cooling the autoclave the reaction mixture was taken out and the catalyst was recovered by filtration. Then ammonia was distilled off from the filtrate and the remaining aqueous solution was passed through a column packed with 500 ml. of ion exchange resins ("H+-type Amberlite 200", made by Rohm & Haas Co.) The ion exchange resins were washed with 1,500 ml. of water, and then with 2,500 ml. of a 1 N aqueous ammonia solution. The solution washed with the aqueous ammonia solution was concentrated to dryness to give 12.6 g. of white crystals. These crystals were identified as 4- aminomethyl cyclohexanecarboxylic acid-1 by infra red absorption spectrum and nuclear magnetic resonance spectrum.

EXAMPLE 2

In a 500 ml. stainless steel autoclave equipped with a stirrer there were charged 20.0 g. of ethyl ester of p-cyanobenzoic acid, 6.4 g. of potassium hydroxide, 90 ml. of a 4.5 % aqueous ammonia solution, 5.3 g. of ethanol and 10.0 g. of developed Raney nickel (made by Kawaken Fine Cheical Co.; NDHT - 90). Hydrogen was introduced until the hydrogen pressure reached 30 atms. The autoclave was heated to 80°C. with stirring and stirring was continued for 30 minutes at 80°C. Then 100 ml. of an aqueous solution containing 22.8 g. of potassium hydroxide were charged under pressure to the autoclave, and additional hydrogen was introduced until the hydrogen pressure reached 80 atms. The autoclave was maintained at 150°C. for 5 hours with stirring. After cooling the autoclave, the reaction mixture was taken out, the catalyst was filtered off, and the filtrate treated in the same manner as in Example 1 to give 15.8 g. of 4-aminomethyl cyclohexane carboxylic acid-1 crystals.

EXAMPLE 3

In a 500 ml. stainless steel autoclave there were charged 20.0 g. of ethyl ester of p-cyanobenzoic acid, 4.6 g. of sodium hydroxide, 90 ml. of an 11 % aqueous ammonia solution, 10.0 g. of ethanol and 10.0 g. of developed Raney nickel (made by Kawaken Fine Chemical Co.; NDHT - 90). Hydrogen was introduced until the hydrogen pressure reached 30 atms. The autoclave was heated to 80°C. with stirring, and stirring was continued for 30 minutes at 80°C. Then 100 ml. of an aqueous solution containing 14.7 g. of sodium hydroxide were charged under pressure to the autoclave and additional hydrogen was introduced until the hydrogen pressure reached 80 atms. The autoclave was maintained at 150°C. for 5 hours with stirring. After cooling the autoclave, the reaction mixture was taken out, the catalyst filtered off and the filtrate treated in the same manner as in Example 1 to give 15.9 g. of crystals of 4-aminomethyl cyclohexane carboxylic acid-1.

EXAMPLE 4

In a 300 ml. stainless steel autoclave there were charged 20.0g. of isopropyl ester of p-cyanobenzoic acid, 11.8 g. of calcium hydroxide. 110 ml. of an 8 % aqueous ammonia solution, 20.6 g. of isopropyl ether and 1.4 g. of developed Raney nickel (made by Kawaken Fine Chemical Co.; NDHT - 90). Hydrogen was introduced until the hydrogen pressure reached 80 atms. The autoclave was heated to 80°C. with stirring, and stirring was continued for 10 hours at 80°C. After cooling the autoclave, the reaction mixture was taken out, the catalyst filtered off and the filtrate treated in the same manner as in Example 1 to give 14.6 g. of crystals. These crystals were identified with those of Example 1 by analysis.

EXAMPLE 5

In a 300 ml. stainless steel autoclave there were charged 20.3 g. of n-butyl ester of p-cyanobenzoic acid, 11.6 g. of magnesium hydroxide, 100 ml. of an 8 % aqueous ammonia solution, 17 g. of dioxane and 6 g. of nickel metal supported on 12 g. of diatomaceous earth which had been reduced just prior to using. Hydrogen was introduced until the hydrogen pressure reached 120 atms. The autoclave was heated to 140°C. with stirring, and stirring was continued for 7 hours at 140°C. After cooling the autoclave, the reaction mixture was taken out, the catalyst filtered off and the filtrate treated in the same manner as in Example 1 to give 12.3 g. of crystals. These crystals were identified with those of Example 1 by analysis.

EXAMPLE 6

In a 300 ml. stainless steel autoclave there were charged 20.0 g. of n-propyl ester of p-cyanobenzoic acid, 4.8 g. of lithium hydroxide, 7.4 g. tetrahydrofuran, 12 g. of stabilized reduced nickel (made by Nikki Kagaku Co.; N-113 containing 50 % by weight of nickel metal which had been reduced in water) and 100 ml. of a 6 % aqueous ammonia solution. Hydrogen was introduced until the hydrogen pressure reached 80 atms. The autoclave was heated to 80°C. with stirring which was continued for 30 minutes at 80°C. and subsequently for an additional 6 hours at 150°C. After cooling the autoclave, the reaction mixture was taken out, the catalyst filtered off and the filtrate treated in the same manner as in Example 1 to give 11.8 g. of white crystals. These crystals were identified with those of Example 1 by analysis.

EXAMPLE 7

In a 300 ml. stainless steel autoclave equipped with a stirrer there were charged 16.1 g. of methyl ester of p-cyanobenzoic acid, 4.0 g. of sodium hydroxide, an alcohol or ether compound as set forth in Table 1, 100 ml. of a 5 % aqueous ammonia solution, and 3.2 g. of developed Raney nickel (made by Kawaken Fine Chemical Co.; NDHT - 90). Hydrogen was introduced until the hydrogen pressure reached 30 atms. The autoclave was heated to 70°C. with stirring, and stirring was continued for 30 minutes at 70°C. Then 70 ml. of an aqueous solution containing 12.0 g. of sodium hydroxide were charged under pressure to the autoclave and additional hydrogen was introduced until the hydrogen pressure reached 90 atms. When the autoclave had been maintained at 150°C. for 5 hours with stirring, the absorption of hydrogen was complete. After cooling the autoclave, the reaction mixture was removed, the catalyst filtered off and the filtrate treated in the same manner as in Example 1 to give white crystals. These crystals were identified with those of Example 1 by analysis. The results are shown in Table I.

EXAMPLE 8

In a 300 ml. stainless steel autoclave equipped with a stirrer, there were charged the alkyl ester of p-cyanobenzoic acid of the type and amount shown in Table II, 4.0 g. of sodium hydroxide, 10 g. of isopropyl ether, 100 ml. of 5 % aqueous ammonia solution and 3.2 g. of developed Raney nickel (made by Kawaken Fine Chemical Co.; NDHT - 90). Hydrogen at a pressure of 30 atmospheres was introduced. After the reactor was maintained at 70°C. for 30 minutes under stirring, 12.0 g. of sodium hydroxide dissolved in 70 ml. of water were introduced with pressure followed by additional hydrogen to reach a pressure of 90 atmospheres. Then reaction was continued with stirring at 150°C. for 5 hours to complete the hydrogen absorption. The catalyst was separated at the end of the reaction. The same treatment as in Example 1 was conducted to give white crystals, which were identified by analysis as identical with the crystals obtained in Example 1. The yields are tabulated below.

Table II

| Run No. | Ester of p-cyanobenzoic acid | Amount (g) | Yield (g) |
|---|---|---|---|
| 1 | n-amyl ester | 21.7 | 12.5 |
| 2 | isoamyl ester | 21.7 | 12.0 |
| 3 | n-hexyl ester | 23.1 | 11.5 |
| 4 | cyclohexyl ester | 22.9 | 12.5 |
| 5 | cyclopentyl ester | 21.5 | 11.1 |

EXAMPLE 9

In a 300 ml. stainless steel autoclave equipped with a stirrer, there were charged 20.3 g. of n-butyl ester of p-cyanobenzoic acid, 34.3 g. of barium hydroxide, 100 ml. of 8 % ammonia water, 17 g. of dioxane and 12 g. of nickel-diatomaceous catalyst which has been reduced just before the reaction (containing 50 % of nickel metal). After hydrogen under a pressure of 120 atmospheres was introduced, the reactor was maintained at 140°C. for 7 hours with stirring, and the catalyst was separated. By employing the treatment used in Example 1, there were obtained 10.7 g. of crystals, which were found to be same as those obtained in Example 1.

What is claimed is:

1. A method for producing 4-aminomethyl cyclohexane carboxylic acid-1 which is characterized in that a low alkyl ester of p-cyanobenzoic acid is reduced at a temperature of from about 10°C to 250°C in a hydrogen atmosphere at a pressure of from about 10 to 200 atmospheres in the presence of a nickel catalyst in an aqueous medium containing ammonia together with at least one alkali metal or alkaline earth metal hydroxide, Table I

| Run No. | Alcohol and ether compounds | (g.) | Yield of 4-aminomethyl cyclohexane carboxylic acid-1 (g.) |
|---|---|---|---|
| 1 | Ethylene glycol | 6.2 | 13.3 |
| 2 | Cyclohexyl alcohol | 10.6 | 11.9 |
| 3 | Methylisoamyl ether | 10.2 | 12.4 |
| 4 | 2-Ethylhexyl alcohol | 13.0 | 12.0 |
| 5 | Tert- butyl alcohol | 7.4 | 13.5 |
| 6 | n-Propyl alcohol | 6.0 | 12.9 |
| 7 | Isoamyl alcohol | 8.8 | 12.1 |
| 8 | n-Hexyl alcohol | 10.2 | 11.9 |
| 9 | Glycerine | 9.2 | 12.9 |
| 10 | Ethyl ether | 7.4 | 11.5 |
| 11 | Ethylter-butyl ether | 10.2 | 12.5 |
| 12 | n-Amyl ether | 15.8 | 11.6 |
| 13 | Diisobutyl ether | 13.0 | 12.1 |
| 14 | Ethylene glycol dimethyl ether | 9.0 | 12.1 |
| 15 | Diethylene glycol | 10.6 | 11.9 |
| 16 | Trimethylene glycol | | 11.2 |
| 17 | Oxetane | 5.8 | 11.1 |
| 18 | Ethylene glycol monomethyl ether | 7.6 | 12.5 | and from 0.1 to 50 mol per mol of p-cyanobenzoic acid of at least one straight chain, branched chain or cyclic alcohol or ether.

2. A method according to claim 1, wherein the amount of hydrogen per mol of a lower alkyl ester of p-cyano benzoic acid is 6 - 100 mol.

3. A method according to claim 1, wherein the lower alkyl ester of p-cyanobenzoic acid employed is the methyl, ethyl, n-propyl, iso-propyl, n-butyl, iso-butyl, sec-butyl, n-amyl, iso-amyl, n-hexyl, cyclopentyl or cyclohexyl ester.

4. A method according to claim 1, wherein the catalyst is developed Raney nickel or a reduced nickel catalyst supported on an inert carrier.

5. A method according to claim 1, wherein the alkali metal or alkaline earth metal hydroxide employed is lithium hydroxide, sodium hydroxide, potassium hydroxide, calcium hydroxide, magnesium hydroxide or barium hydroxide.

6. A method according to claim 1, wherein the alkali metal hydroxide is sodium hydroxide or potassium hydroxide.

7. A method according to claim 1, wherein ethyl-, n-propyl, iso-propyl-, n-butyl-, iso-butyl, sec-butyl, tert-butyl, n-amyl, iso-amyl, n-hexyl-, heptyl-, octyl, 2-ethyl hexyl-alcohol; ethylene glycol, trimethylene glycol, glycerine, cyclohexyl alcohol, cyclopentyl alcohol, cyclohexyl methyl alcohol; aliphatic ethers comprising mono or mixed ethers containing two alkyl groups selected from the group of methyl-, ethyl-, n-propyl-, iso-propyl, n-butyl-, iso-butyl-, sec-butyl-, tert-butyl-, n-amyl-, iso-amyl; cyclic ethers such as oxetane, tetrahydrofuran, tetrahydropyran, dioxane; ethylene glycol monomethyl ether, ethylene glycol dimethyl ether, diethylene glycol; polymethylene glycol such as diethylene glycol, trimethylene glycol is employed as alcohol or other compound.

8. A method according to claim 1, wherein the amount of ammonia employed is sufficient to provide from 2 to 10 gram equivalents of ammonium ion per mol of the alkyl ester of p-cyanobenzoic acid.

9. A method for producing 4-aminomethyl cyclohexane carboxylic acid-1 which is characterized in that the methyl ester of p-cyanobenzoic acid-1 is reacted at 50°–180°C, under 10–150 atmospheres with hydrogen in the presence of developed Raney nickel catalyst in an aqueous medium containing 2–10 mols per mol of ester of p-cyanobenzoic acid of ammonia, 2 mols per mol of ester of p-cyanobenzoic acid of sodium hydroxide or potassium hydroxide, and 1–3 mols per mol of ester of p-cyanobenzoic acid of methanol, ethanol, n-propyl alcohol, iso-propyl alcohol, n-butanol, iso-butanol, sec-butanol, tert-butanol, iso-propyl ether, tetrahydrofuran or dioxane.

* * * * *